Aug. 20, 1935.    K. HAASE ET AL    2,012,098
APPARATUS FOR TREATING MINERAL SALTS
Filed Nov. 10, 1930
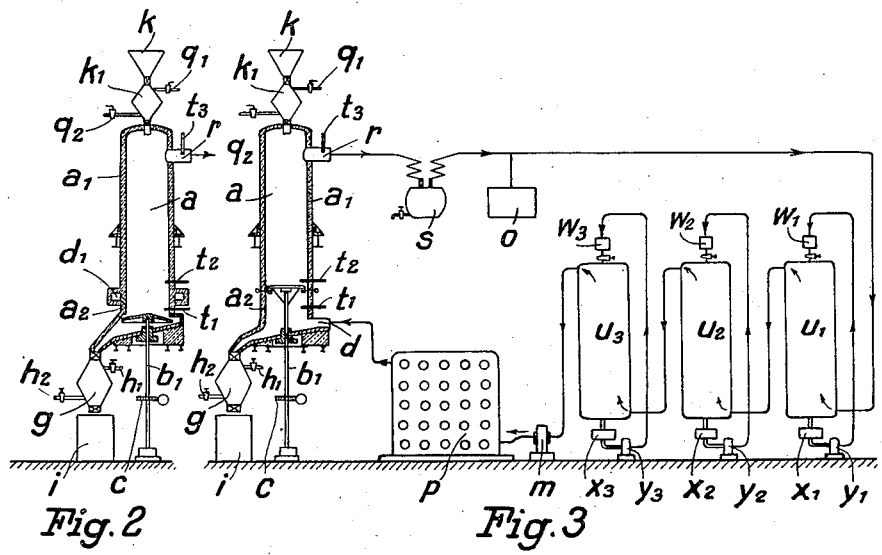
Inventors:
Karl Haase
Wilhelm Michels Patented Aug. 20, 1935

2,012,098

UNITED STATES PATENT OFFICE 2,012,098

APPARATUS FOR TREATING MINERAL SALTS

Karl Haase, Bleicherode, and Wilhelm Michels, Goslar, Germany, assignors to Preussische Bergwerks- und Hutten - Aktiengesellschaft, Berlin, Germany Application November 10, 1930, Serial No. 494,672 In Germany November 12, 1929

1 Claim. (Cl. 23—262)

This invention relates to the dehydration of the hydrates of magnesium chloride, either alone or in admixture with sodium chloride, potassium chloride or ammonium chloride and also in the form of the double salts, carnallite and ammonium carnallite.

The invention is concerned with an improved dehydrating process of the kind in which the magnesium chloride hydrates are treated with a current of air or other relatively chemically inactive gas in a drying apparatus at an elevated temperature in order to expel therefrom the water of crystallization partially or completely as the case may be.

It has been proposed to carry out a process of this kind, with the object of producing partially dehydrated magnesium chloride, by continuously introducing the hydrated compounds at the upper end of the drying apparatus and causing them to descend therethrough while a current of heated air is passed upwardly through the apparatus on the contraflow principle, the products dehydrated to the required degree being continuously removed from the lower end of the apparatus. The temperature of the ingoing air is maintained at such a value that the fresh hydrated product introduced is not fused or sintered by partially cooled air attaining thereto.

It has also been proposed to carry out a process of the kind above set forth, with the object of producing anhydrous magnesium chloride, by treating the hydrated compounds in two stages, the first stage being identical with that set out in the preceding paragraph and the second stage comprising introducing the partially dehydrated product from the first stage intermittently into the upper end of a drying apparatus through which it descends due to the continuous removal of anhydrous product from the lower end of the apparatus, a current of hydrochloric acid gas being passed upwardly through the apparatus which is heated externally to a temperature not far below the fusion temperature of the anhydrous salt.

In these prior proposals the drying apparatus employed comprise vertical retorts having discharge means at the lower end consisting of ribbed or star wheels or screw conveyors, the gas current being introduced through annular inlets extending around the inner circumferences of the retorts just above the discharge ends thereof.

Automatic shaft furnaces of the kind referred to are particularly suitable for use as dehydrating furnaces inasmuch as they are free from the drawbacks of the ordinary rotating tube furnaces and of the ordinary shaft furnace provided the method of operation is regulated in such a manner as to provide for a suitable selection of the temperature of the inert gases, of hot air for instance, combined with means of shortening the duration of treatment at the maximum temperature. In view of the low operating temperature the water of crystallization is slowly expelled. The moisture of the drying gases or air is kept within such limits that no decomposition will occur in the colder zones of the furnace situated at a higher level. As compared with the methods heretofore employed for the dehydration by means of shaft furnaces this invention provides for certain exactly defined conditions of operation as a result of which it becomes possible to obtain the haloids and particularly the chloride of magnesia in the highest degree of purity by very simple and surprisingly efficient methods. The maximum temperature of the air according to measurements directly above the mechanical grate in the manufacture of dihydrate ranges approximately between 140 to 160 degrees C. and in the manufacture of tetrahydrate this temperature is approximately 120 to 140 degrees C., the operation being conducted in such a manner that these maximum temperatures are caused to act for a short time only, that is to say directly before the removal of the salt, upon the material which has undergone a thorough preliminary drying in the upper part of the shaft furnace at low temperatures. By this method of working the unexpected result is accomplished that the entire contents of the oven or furnace will remain from the start in a loose state adapted for ready displacement, so that the material upon the separation of the finished salt will move down automatically and the entire operation will go on continuously and automatically and free from disturbances and with the assistance of a mechanical grate. It should of course be understood that the oven or furnace is insulated to prevent loss of heat.

The invention will be more particularly described with reference to the accompanying drawing showing diagrammatically an oven or furnace embodying the principles of the invention by way of exemplification. In Fig. 1 an automatic shaft furnace with rotatable grate is shown with means adapted for the manufacture of dihydrate of chloride of magnesia from the hexahydrate in a hot current of air. Fig. 2 is a somewhat modified construction of a shaft furnace with rotatable grate in vertical longitudinal section. Fig. 3 shows for instance an arrangement of apparatus for the manufacture of anhydrous chloride of magnesia from dihydrate in a hot, circulating current of chloride of hydrogen.

In accordance with Fig. 1 the furnace comprises for instance a cylindrical upper portion $a$ of iron of suitable height, as for instance 3.4 meters (13½ feet) and a diameter of for instance 1.14 meter (3¾ feet) and provided with an interior enamel lining and further provided with a rotatable grate $b$ presenting an active grate surface of about 1.2 square meters (12.9 sq. feet) and provided at its edges with rollers and with toothed driving gear. The lower part $a_2$ is of conical or cylindrical shape and is provided with the admission tube $d$ for the entrance of air and with the discharge tube or nozzle $f$ which communicates with the tapping compartment $g$ which may be closed by the two faucets or values $h_1$, $h_2$ and below which the collecting chamber or vessel $i$ is arranged for the reception of the dehydrated salt, that is to say of dihydrate. At its top the furnace is open and it is surmounted with a charging hopper $k$ for hexahydrate. The air which is required for the drying operation is aspirated by a blower $m$ and passes through a heater $p$ of any suitable construction and adapted to be heated by steam which is admitted at $o$, and the air is then caused to be blown into the section $a_2$ of the tube furnace below the grate $b$. In the heater $p$ the air is heated to such a degree that it is delivered above the grate at the position of the thermometer $t_2$ with the desired temperature of for instance 155 degrees C. The height of 3.4 meters and the active grate surface of about one square meter correspond to a capacity of the furnace of about three thousand kilograms (6335 pounds) of granular hexahydrate. Thus, if for instance 760 cubic meters (about 1011 cubic yards) of dry air and at the temperature of the atmosphere are for instance heated every hour to the entering temperature of 155 degrees C. as hereinbefore stated and are blown thrugh the column of salt in the furnace the air which has been impregnated with water vapor during the drying operation, will leave the furnace at its upper end with a temperature of 80 degrees C. The rate of output of the furnace amounts to 40 kilograms (88 pounds) of dihydrate per hour or 960 kilograms (2112 pounds) a day. The output depends upon the rate at which the air passes through the furnace per hour and upon the size of the grate surface, and furthermore on the working temperature and on the height of the furnace, and on the height of the charge of salt in the furnace.

The starting of the operation of the furnace is either effected in the presence of a continuously tempered current of air of 155 degrees C. which may be regarded as the normal working temperature, or with a discontinuously tempered current of air having a temperature which gradually rises from 80 degrees to 155 degrees C. In the continuously tempered current of air the lower section of the furnace is charged with finished dihydrate from the preceding operating stage and in its upper part with the hexahydrate. Then, the grate is gradually set in operation and the dihydrate is removed by a kind of shearing off operation, while hexahydrate is admitted simultaneously in the upper section until the entire amount of dihydrate has been removed from the furnace. In this stage commences the actual separating period of the dihydrate salt. In the case of discontinuously tempered currents of air the furnace is only charged with hexahydrate and the temperature of the current of air is gradually raised from 80 degrees C. to 155 degrees C. The separating grate in this case is only operated as soon as the air at the upper end of the furnace escapes with a temperature of 60 to 80 degrees C. In this case dihydrate is obtained directly from hexahydrate upon starting the operation of the furnace.

One of the thermometers $t_1$ which are important for the proper carrying out of the method of this invention is disposed below the grate $b$, while the other thermometer $t_2$ which has already been referred to is arranged directly above the grate, and a third thermometer $t_3$ is mounted at a somewhat greater height of about 20 centimeters (about 8 inches) above the grate. Other thermometers not shown in the drawing are arranged in any suitable number and at any suitable distances at the upper section $a$ of the furnace in such a manner that their graduated portions will laterally protrude from the wall of the furnace for the observation of the temperatures of the salt.

The temperature of the current of air will be so adjusted that the thermometer $t_2$ which is covered with salt indicates for instance 155 degrees C. above the grate $b$ in the manufacture of dihydrate, while the thermometer $t_3$ indicates 150 degrees C. The grate $b$ is then rotated and salt is removed or sheared off thereby, until the thermometers show a decrease of temperature of about 3 to 5 degrees C. as a result of the moving down of cooler portions of salt from higher situated zones of the furnace. After the increase of temperature to 150 and respectively 155 degrees C. in consequence of the continuously flowing hot currents of air the rapidly effected shearing off operation is again repeated in short intervals. In proportion with the discharge or separating off of the finished dihydrate new charges of hydrate of chloride of magnesia are introduced to the upper opening of the furnace, so that the column of salt in the furnace is permanently kept at substantially the same level. In accordance with the particular height of the furnace the air which has been introduced for instance with a constant temperature of 160 degrees C. below the grate will escape from the top with a temperature of 60 to 116 degrees C. The end temperature of the air may be exactly regulated by properly adjusting the height of the oven and the height of the charge of salt and it should not be above the melting point of the material fed to the furnace, because otherwise choking up of the charge is liable to occur. This temperature is preferably as low as possible, for instance 70 degrees C. by a suitable selection of the height of the charge, so that a satisfactory utilization of the waste heat may be obtained by the preliminary drying of the hydrate of the chloride salt.

Instead of using pure hydrates of chloride of magnesia it is also possible to treat natural or artificial mixtures with alkali chlorides in accordance with the method hereinbefore described.

For the dehydration of other salts containing water of crystallization, such as for instance sulfate of magnesia, iron vitriol, sulfate of copper and the like the working conditions are to be adjusted to correspond to the physical behavior of these hydrates, the temperatures being so arranged that the dehydration may take place gradually while melting or fusion or sintering of the charge is avoided.

The continuously operating shaft furnace with mechanical separating and discharging grate according to this invention may also be advantageously utilized for the dehydration of dihydrate of chloride of magnesia for the purpose of manufacturing anhydrous chloride of magnesia. In this case a strong, hot current of hydrogen-chloride (hydrochloric acid) is caused to circulate in the apparatus, the temperature of which directly above the grate may for instance be kept between 450 and 550 degrees C., while its discharging temperature in the upper part of the furnace is kept below the melting point of the charge fed to the furnace, for instance between 150 and 250° C.; by this means it becomes possible to dispense with the difficult additional and heretofore necessary heating from the outside. An anhydrous dry finished product is obtained which contains 99.0% and more of $MgCl_2$.

A furnace in accordance with this description and otherwise substantially known may be operated for the purposes of this invention in such a manner that for instance dihydrate or mixtures thereof with alkali chlorides are continuously introduced at the top while the dehydrated chloride of magnesia is separated off below by means of a mechanical grate as for instance a rotating grate. In this feature of the process a current of gaseous hydrogen chloride at a temperature of 250 to 550° C. is continuously forced through the column of salt above the grate and at such a rate and pressure that the temperature of the product to be dehydrated is maintained directly above the grate, while it is continuously reduced in the upper zones of the furnace, until at the upper end of the furnace the temperature drops down to 150 to 250° C. This lower limit of the drying temperature is obtained in a simple manner by suitably adjusting the height of the furnace and the height of the charge of dihydrate, so that by this means any danger of melting of the charge of material is sure to be avoided. The upper limit of the drying temperature of 450 to 550° C. may be regulated by means of two electric thermometers arranged at slight distances above each other, so that the grate will be operated, as soon as the lower thermometer mounted directly above the grate indicates for instance 500° C. while the upper thermometer indicates 475° C. The shearing or discharging operation is continued, until the temperature of the lower thermometer has for instance been reduced to 475° C. and that of the upper thermometer to 450° C. in consequence of the descent and sliding down of the salt from the cooler zones of the furnace arranged at a higher level. After a short time the two thermometers have been again raised to temperatures of 500° and 475° C. respectively in view of the action of the continuously flowing hot gas of hydrogen chloride, and the separation of the anhydrous salt is again commenced. This cycle of operations is continuously repeated, fresh dihydrate being fed at the top of the furnace in proportion with the shearing off of $MgCl_2$ at the lower part of the furnace. The current of hydrogen chloride which is discharged at the top with the water of crystallization of magnesium chloride expelled may for instance be dried by means of concentrated sulfuric acid, or it is condensed in suitable condensers provided with air or water cooling means and of suitable material and, if desired, with part of the gaseous hydrogen chloride used as a drying agent, and the condensate is separated off and obtained as concentrated aqueous hydrochloric acid of 38–40% HCl. The cooled and not absorbed hydrogen chloride, after having been dried and after it has been filled up to a greater volume from a supply tank or the like filled with gaseous HCl is aspirated by a blower and after being heated to 450 to 550° C. it is again caused to pass through the shaft furnace. In spite of the use of a current of strong gaseous hydrogen-chloride the water of crystallization does not absorb any more HCl with the formation of concentrated aqueous hydrochloric acid than in the case of the ordinary process of dehydration by means of a slow and weak current of HCl, while the drying period may be shortened to amount to a fraction of the time heretofore necessitated.

It is of advantage to operate the furnace with dihydrates, or with natural or artificial mixtures of dihydrate and alkali chlorides which have been previously obtained from hydrates of chloride of magnesia or from corresponding mixtures in a similar manner in continuously operating shaft furnaces with mechanical separating grate with the assistance of a counter current of hot air and with proper regulation of the temperatures of the escaping air which should not exceed the melting point of the material to be fed to the furnace. In accordance with the modification of Figures 2 and 3 the furnace comprises a cylindrical upper section $a_1$ of iron and with closed top and provided at its inside with ceramic lining and having a height of for instance 2.40 meters (7.8 feet) and 0.80 (2.6 feet) inner diameter. The furnace is provided with the gas discharge tube or nozzle $r$ for the hot mixture of water vapor and hydrogen-chloride, the rotatable separating grate $b$ with shaft $b_1$ and driving means $c$ and with the lower section $s_2$ which may be of conical shape and carries a tube $d$ for the admission of hydrogen-chloride and which has means for the discharge of the $MgCl_2$. For the reception of the treated material the emptying container $g$ is provided which may be evacuated or rinsed with indifferent gases by means of the short tubes $h_1$, $h_2$ connected with corresponding supplies. For the admission of the charge a feeding container or chamber $k_1$ with charging hopper $k$ is provided which is likewise connected with conduits $q_1$, $q_2$ adapted for the creation of a vacuum and respectively for the admission of rinsing gas. The thermometers $t_1$, $t_2$, $t_3$ serve for the purpose of measuring the working temperatures. Underneath the emptying container $g$ a sheet metal drum $i$ is provided for the reception of the finished, anhydrous $MgCl_2$ which may be connected in any suitable manner to the container $g$, as for instance by a bayonet joint. The current of hydrogen-chloride which has been heated to about 550° C. enters the furnace according to Figure 2 above the separating grate $b$, and in accordance with the modification of Figure 3 below said grate, according to the fact whether or not the material of the grate $b$ will resist the attack of hydrogen-chloride. In Figure 2 the admission of hydrogen chloride is effected from a distributor $d_1$ of annular shape provided with ceramic lining and disposed on the furnace shell, so that direct contact of the gas with the grate is prevented by a protecting layer of anhydrous $MgCl_2$ between the distributor and the separating grate. This protecting layer may have any desired height. The arrangement of the thermometers $t_1$ and $t_2$ is such as to correspond to the particular working procedure.

In accordance with the modification of Figure 3 a blower $m$ is provided of a material to withstand the action of dry, cold gas of hydrogen-chloride and by means of which the HCl-gas which circulates in the apparatus is forced into a gas heater $p$ of ceramic material in which the gas is preheated to about 550 degrees C. and from which it is delivered by the tube or nozzle $d$ into the lower portion $s_2$ of the shaft furnace $a$ charged with the metal salt to be dehydrated. In the modification of Figure 2 the gas is introduced by means of the distributor $d_1$. After having passed through the layer of salt the hydrogen-chloride which carries the water vapor and has been cooled down to 150 to 250° C. is discharged from the furnace by way of the tube $r$, and it then passes through the preliminary cooler with retainer or catch basin or the like $s$ for condensed, liquid hydrochloric acid and is cooled in stoneware towers $u_1$, $u_2$, $u_3$ of known construction by means of concentrated, circulating sulphuric acid. These stoneware towers $u_1$, $u_2$, $u_3$ are packed with suitable, distributing filling or packing bodies; on the top of the towers containers $w_1$, $w_2$, $w_3$ for sulphuric acid and at the bottom of the towers sulphuric-acid coolers $x_1$, $x_2$, $x_3$ are provided, and the height of the towers is usually 3 to 5 meters (0.95 to 1.65 feet). $y_1$, $y_2$, $y_3$ in the drawing are sulphuric-acid pumps or acid eggs by means of which the acid rinsing down in the towers is pumped back into the containers or reservoirs $w_1$, $w_2$, $w_3$. Means should also be provided for the withdrawal of the supply of sulphuric acid which has to be temporarily renewed. The portion of the strong hydrochloric acid which has become absorbed in the preliminary cooler by the water vapor is continuously replaced from a supply in the gas tank or gasometer $o$. The current of hydrogen chloride enters the blower $m$ with a temperature of 30 to 50° C.

The furnace herein described and shown by way of exemplification possesses for instance a capacity of 750 kilograms (1650 pounds) dihydrate. The grate surface amounts for instance to 0.5 square meters (5.38 sq. feet). The yield of the furnace depends on the amount of the hydrogen-chloride admitted per hour, and on the height of the furnace and the temperature and on the heat capacity of the hydrogen-chloride. With a charge of 750 kilogrs. dihydrate, a consumption of hydrogen-chloride of 450 cubic meters (598½ cubic yards) per hour, figured at 20° C. and the preheating of the HCl-gas to 550 degrees C. there will be manufactured per hour about 60 kilograms (132 lbs.) anhydrous $MgCl_2$ per hour or about 1400 kilograms (about 3080 pounds).

The mode of operation of the furnace is effected in accordance with the explanation given with regard to Figure 1, either in a continuously tempered current of HCl at 550 degrees C. by first charging the furnace with finished, anhydrous $MgCl_2$ from the preceding working stage and by placing thereupon a supply of dihydrate; or the furnace is operated with a discontinuously tempered current of HCl by being merely charged with dihydrate and by slowing raising the temperature of the HCl-current to 550 degrees C., and by only commencing the separation or shearing off of the anhydrous salt, when the gas mixture escapes from the top part of the furnace with a temperature of 150 to 250° C. After the heating and the starting of the furnace the continuous production of anhydrous $MgCl_2$ already described is going on in such a manner that the water carried over from the dehydrating procedure is condensed or the gas current is dried, for instance by means of concentrated sulphuric acid with constant replacing of the loss of acid. The entering of air or of other gases into the rotatable shaft furnace may be controlled or may be prevented in the case of working with a circulating current of hydrogen-chloride by providing closable containers $k_1$ or $g$ on top of the furnace or at the bottom or both above and below the shaft furnace, as shown in Figures 2 and 3, said containers being evacuated or being rinsed with indifferent gases.

In a continuously operating shaft furnace it is possible moreover, as already mentioned, to dehydrate other metal salts containing water of crystallization, and which in an attempt to expel the water of crystallization are likely to undergo decomposition, such substances being dehydrated in an indifferent or active gas current, provided the temperature of said indifferent or active gas current is regulated in such a manner that at no part of the oven or furnace fusion or sintering of the material can take place. In certain cases, where readily melting salts or salts which are not decomposable in the first dehydrating stage, are used, a partial preliminary dehydration in a vacuum-drying oven or in some other manner may be effected.

It should be understood that the invention is not confined to the particular mode of operation and treatment and arrangement of apparatus herein shown and described merely by way of exemplification and illustration, but it is susceptible of changes and modifications without deviating from the spirit of the invention and within the scope of the appended claim.

We claim:—

Apparatus for dehydrating material containing water comprising a shaft furnace, means for feeding the hydrated material to the furnace at the top thereof, means for withdrawing the dehydrated material from the bottom of the furnace, a shearing grate located in the lower part of the furnace, means for rotating the grate, means for admitting hot gases in the lower portion of the furnace, means for withdrawing the hot gases in saturated condition from the upper portion of the furnace and a trinity of temperature measuring devices, one located at the point of evacuation of the saturated gases and the other two in the vicinity of the grate and spaced from each other vertically of the furnace, means for receiving the saturated gases and connected with the upper portion of the furnace, a source of gas supply connected with said gas receiving means, cooling towers for receiving said gases and means for reheating the gases and returning the gases to the lower portion of the furnace.

KARL HAASE.
WILHELM MICHELS.